(12) United States Patent
Kanefsky

(10) Patent No.: US 6,603,984 B2
(45) Date of Patent: Aug. 5, 2003

(54) METHODS AND SYSTEMS FOR MANAGING INFORMATION ON WIRELESS DATA DEVICES

(75) Inventor: Steven T. Kanefsky, Redmond, WA (US)

(73) Assignee: AT&T Wireless Services, Inc., Redmond, WA (US)

(*) Notice: Subject to any disclaimer, the term of this patent is extended or adjusted under 35 U.S.C. 154(b) by 0 days.

(21) Appl. No.: 09/854,887

(22) Filed: May 14, 2001

(65) Prior Publication Data
US 2001/0044327 A1 Nov. 22, 2001

Related U.S. Application Data

(60) Provisional application No. 60/204,606, filed on May 16, 2000.

(51) Int. Cl.[7] .............................. H04B 1/38; H04M 1/00
(52) U.S. Cl. ................... 455/566; 455/575; 345/841; 345/851; 709/218
(58) Field of Search ........................... 455/566, 568, 455/575, 456, 457, 550, 557, 556; 345/348, 352, 354, 339, 340; 709/218; 701/208, 207

(56) References Cited

U.S. PATENT DOCUMENTS

| | | | | |
|---|---|---|---|---|
| 5,732,398 A | * | 3/1998 | Tagawa | 705/5 |
| 5,809,415 A | * | 9/1998 | Rossmann | 455/422 |
| 5,899,995 A | * | 5/1999 | Millier et al. | 707/102 |
| 6,002,946 A | * | 12/1999 | Reber et al. | |
| 6,091,956 A | * | 7/2000 | Hollenberg | 455/456 |
| 6,119,155 A | * | 9/2000 | Rossmann et al. | 709/203 |
| 6,139,177 A | * | 10/2000 | Venkatraman et al. | |
| 6,167,251 A | * | 12/2000 | Segal et al. | 455/405 |
| 6,173,316 B1 | * | 1/2001 | De Boor et al. | 709/218 |
| 6,226,630 B1 | * | 5/2001 | Billmers | 707/3 |
| 6,243,030 B1 | * | 6/2001 | Levine | 340/995 |
| 6,243,080 B1 | * | 6/2001 | Molne | 455/90 |
| 6,253,326 B1 | * | 6/2001 | Lincke et al. | 713/201 |
| 6,266,615 B1 | * | 7/2001 | Jin | 701/213 |
| 6,272,332 B1 | * | 8/2001 | Matsumoto et al. | 455/412 |
| 6,349,203 B1 | * | 2/2002 | Asaoka et al. | 455/414 |
| 6,351,634 B1 | * | 2/2002 | Shin | |
| 6,418,325 B1 | * | 7/2002 | Reber et al. | 455/556 |
| 6,424,829 B1 | * | 7/2002 | Kraft | 455/412 |
| 2001/0012980 A1 | * | 8/2001 | Uchida et al. | |
| 2001/0020213 A1 | * | 9/2001 | Hatano | |
| 2002/0023271 A1 | * | 2/2002 | Augenbraun et al. | |

FOREIGN PATENT DOCUMENTS

WO  WO 01/60092 A2  *  8/2001  ............ H04Q/7/22

\* cited by examiner

*Primary Examiner*—Edward F. Urban
*Assistant Examiner*—Temica M. Davis
(74) *Attorney, Agent, or Firm*—Oliff & Berridge, PLC

(57) ABSTRACT

Various techniques for accessing various sources of information are provided by a wireless server and wireless device, such as an Internet-ready cellular phone. As a consumer navigates about a menu displayed at the wireless device, the wireless server can provide various unsolicited messages to the wireless device or activate various scripts directed to making various queries, displaying special messages and performing various tasks, such as accessing external web sites and placing phone calls.

28 Claims, 6 Drawing Sheets

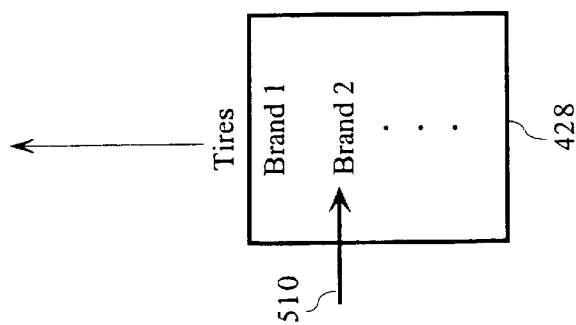
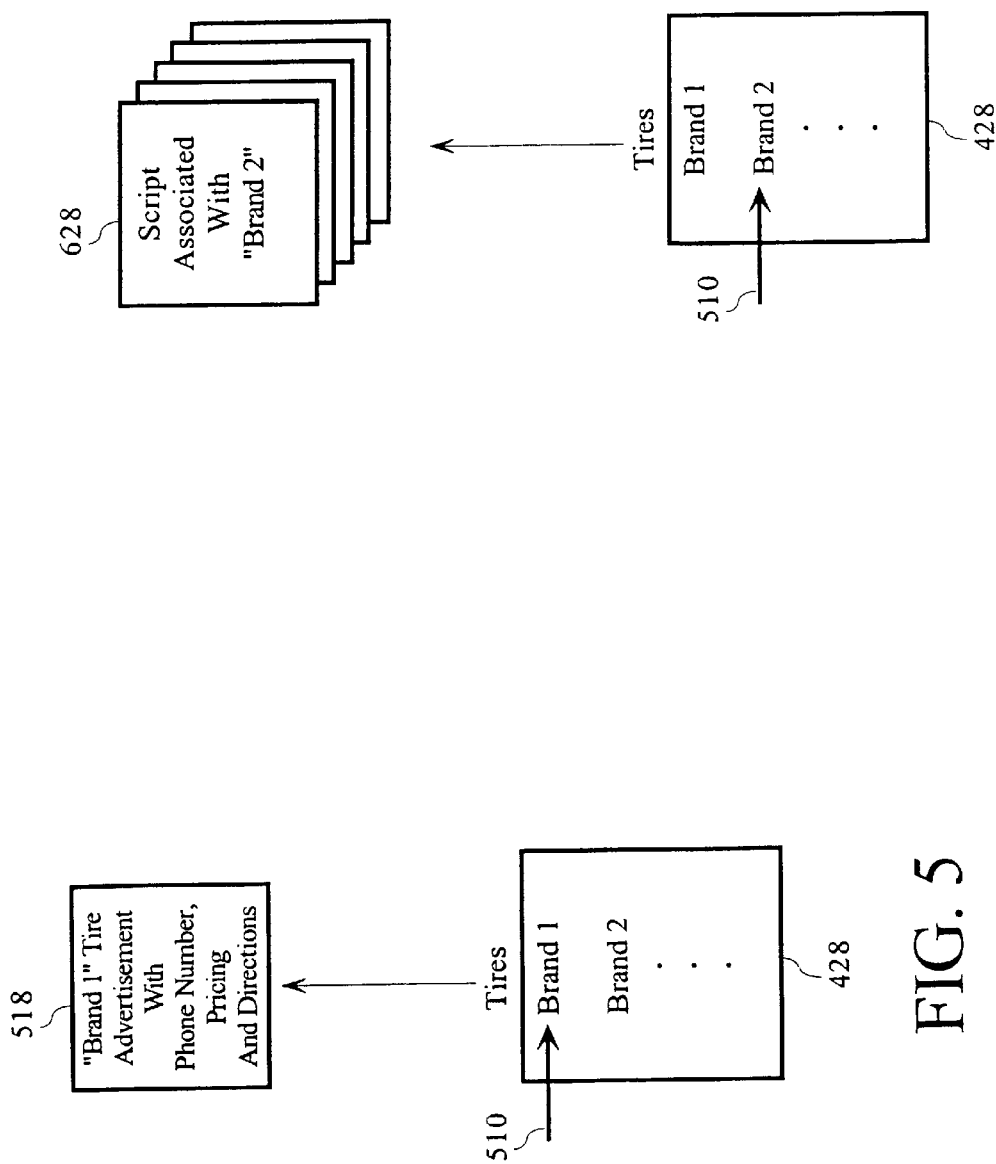

METHODS AND SYSTEMS FOR MANAGING INFORMATION ON WIRELESS DATA DEVICES

This non-provisional application claims the benefit of U.S. Patent Provisional Application No. 60/204,606 entitled "METHODS AND SYSTEMS FOR MANAGING CUSTOMIZABLE CONTENT ON WIRELESS DATA DEVICES" filed on May 16, 2000. The Applicant of the provisional application is Steven KANEFSKY. The above provisional application is hereby incorporated by reference in its entirety including all references cited therein.

CROSS-REFERENCE TO RELATED APPLICATIONS

This application is related to co-pending U.S. application Ser. No. 09/855,117 entitled "METHODS AND SYSTEMS FOR SEARCHING AND MANAGING INFORMATION ON WIRELESS DATA DEVICES," filed concurrently herewith and commonly assigned.

BACKGROUND OF THE INVENTION

1. Field of Invention

The invention relates to methods and systems for accessing information over wireless links.

2. Description of Related Art

Wireless devices, such as cellular phones, are now commonplace consumer commodities. As the size of the cellular market expands, cellular competitors have attempted to increase the variety of functions in cellular phones in order to attract a greater share of the cellular market. One popular addition to the cellular market is the addition of Internet Web browsers to wireless phones.

Unfortunately, cellular phones do not make the best Internet browsing tools as they suffer from a number of limitations, such as their relatively small display size and the paucity of available control buttons. Such limitations both restrict the ease of Internet browsing and vastly limit the display capacity for time-critical or specialized messages, such as sales or pricing information directed to specific merchandise. Thus, new technology that can accommodate Internet browsing and messaging on cellular phones is desirable.

SUMMARY OF THE INVENTION

In various exemplary embodiments, methods and systems for accessing various sources of information are provided using a wireless server and wireless device, such as an Internet-ready cellular phone. As a consumer navigates about a menu displayed at the wireless device, i.e., issues various navigation commands, the wireless server can retrieve extrinsic information based on received instructions, such as information relating to commercial advertisements and display various messages at the wireless device based on the extrinsic information.

In other embodiments, the received instructions can activate a script directed to performing one or more operations. The operations can include making various queries, displaying special messages and performing various tasks, such as accessing external web sites and placing phone calls. Other features and advantages of the present invention are described below and are apparent from the accompanying drawings and from the detailed description which follows.

BRIEF DESCRIPTION OF THE DRAWINGS

The invention is described in detail with regard to the following figures, wherein like numbers reference like elements, and wherein:

FIG. 5 depicts a message generated in response to an item selection;

FIG. 6 depicts a script activated in response to an item selection; and

DETAILED DESCRIPTION OF PREFERRED EMBODIMENTS

Figure 1:
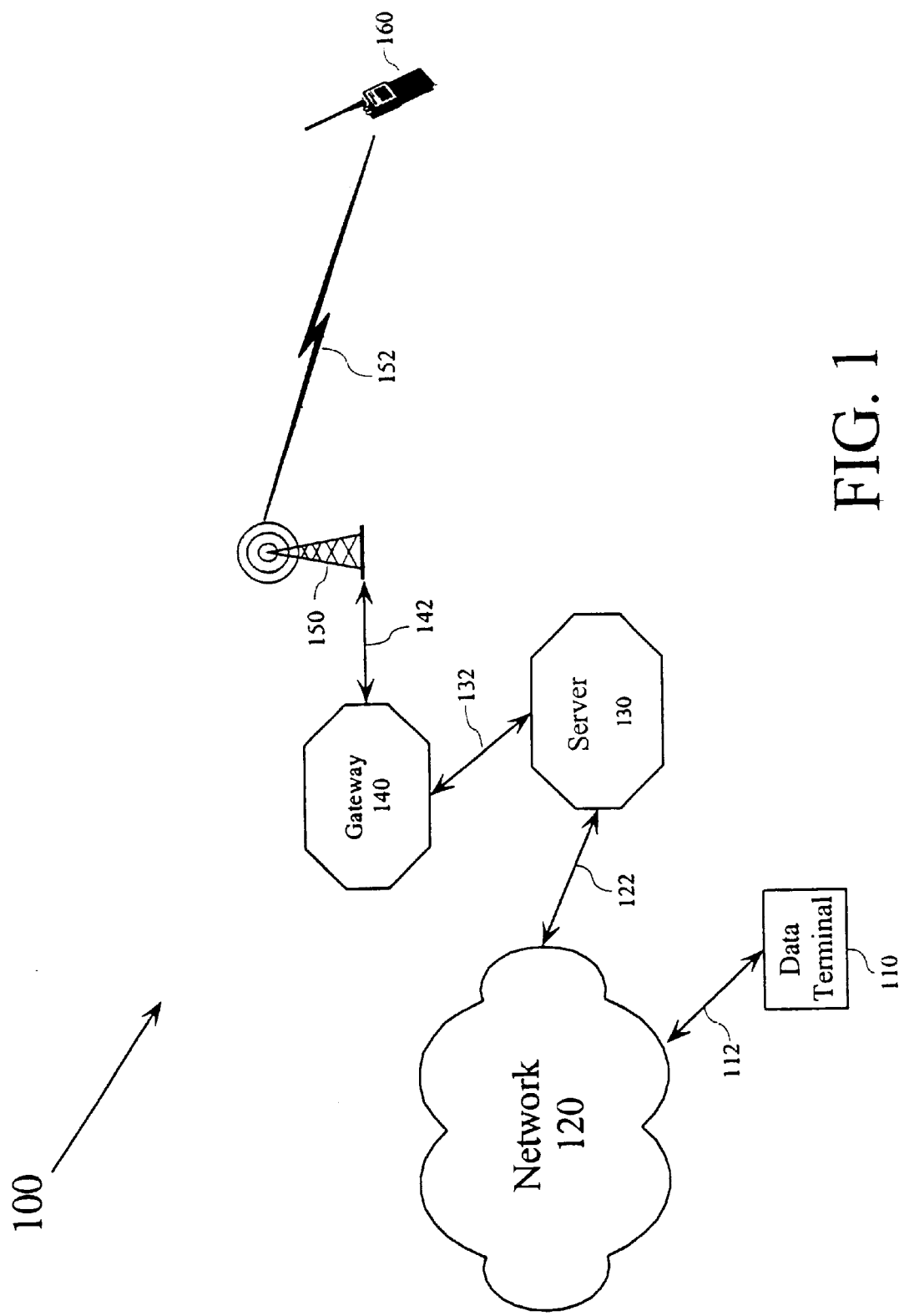
FIG. 1 is a block diagram of an exemplary wired/wireless data network according to the present invention.

As the size of the cellular market expands, cellular competitors have attempted to increase the variety of functions in cellular phones in order to attract a greater share of the cellular market. One popular addition to the cellular market is the addition of Internet Web browsers to wireless phones.

Unfortunately, cellular phones do not make the best Internet browsing tools as they suffer from a number of limitations, such as their relatively small display size and the paucity of available control buttons. Such limitations both restrict the ease of Internet browsing, as well as vastly limit the number of messages that, given more display capacity, could otherwise appear as things like ornate advertising banners on a web page.

One approach to navigating external networks from a cellular phone is to incorporate a hierarchical menu that a consumer can navigate using only a few buttons. For example, upon initial activation, a cellular phone can display a first level of a menu, i.e., a root folder, that can contain a list of items such as other folders, email/voicemail files and executable files. A consumer viewing the menu can accordingly navigate among the various folders of the menu until the consumer selects a non-folder item, such as a command designed to display stock quotes or place a phone call.

While such hierarchical menus are useful, conventional hierarchical menus generally cannot provide information that cellular consumers may deem beneficial. For example, a cellular phone having a conventional menu may aid a motorist stranded by the side of a highway to locate an automobile service provider. However, it should be appreciated that such a motorist can generally benefit from using an automobile service provider that provides value-added services, such as expedited towing, that the motorist may not even know are available. In this example, if the motorist's cellular phone is configured to automatically display messages relating to available automobile service providers, as well as their services, the motorist could more easily find those providers and/or services that precisely fulfill the consumer's needs.

Furthermore, by automatically evoking targeted scripts, i.e., sequences of messages, queries and commands, a cellular phone can not only assist the motorist to find precisely tailored services, but can also expedite the acquisition of those services. For the example above, as the stranded motorist browses in an automobile service-related menu folder, such browsing can activate various scripts designed to acquire specific information from the motorist. As the motorist responds to the script's queries, the motorist can not only quickly identify a number of desired services, but can also select service providers according to various identified criteria, such as location, price and the quality of the desired services.

Additionally, an activated script can assist in acquiring and coordinating any other desired service by evoking commands directed to various activities, such as reserving a rental car, directing the motorist to a particular web site and placing a phone call to a particular service provider.

In the context of the following disclosure, the term "message", or "directed message", can refer to any information that can be displayed in response to a navigation command (other than items in a folder), as opposed to information displayed in direct response to a non-folder item selection. All other information shall be referred to as "content" or a "content message".

For example, although a wireless device can display the content of an email in response to an email item selection, such content is not a "directed message" as the content of the email is displayed in response to a non-navigation menu command. Furthermore, although a consumer navigating, i.e., browsing, about the Internet from a cellular phone can view an advertisement inherent in a particular web page, such an advertisement is again not a "directed message" as it is not displayed in response to a menu navigation command, but instead to a web browsing command.

Also in the context of the following disclosure, a "script message", like a "directed message", can refer to any information that can be displayed in response to a navigation command. However, a script message, unlike a directed message, occurs in response to an ongoing script. Accordingly, a "script message" can be a "directed message" but a directed messages may not necessarily be a script message.

FIG. 1 is a block diagram of an exemplary wired/wireless data network capable of providing a consumer with targeted wireless services. The communication system 100 includes a network 120 coupled to a data terminal 110 and a server 130 via links 112 and 122, respectively. The server 130 is coupled via link 132 to a gateway 140, which in turn is coupled to an access point 150 via link 142. The access point 150 can communicate with a wireless device 160, such as an Internet-ready wireless cellular phone, using a wireless link 152.

In operation, the wireless device 160 can transmit information to and receive information from the access point 150 over link 152. The access point 150, in turn, can relay the information to and from the gateway 140. As information is relayed across the gateway 140, the gateway 140 can manipulate the form of the information to resolve any incompatibilities between the server 130 and the access point 150/wireless device 160.

For example, the server 130 can communicate with the network 120 and gateway 140 using the transmission control protocol/Internet protocol (TCP/IP) while the wireless device 160 and access point 150 can communicate according to the IS-136 wireless protocol. To form an effective interface, the gateway 140 can receive information from the server 130 in the form of TCP segments, and extract and repackage the information in the received TCP segments into IS-136 packets and pass the IS-136 packets to the access point 150. Similarly, the gateway 140 can receive IS-136 packets from the access point 150, extract and repackage the information in the IS-136 packets into TCP segments and pass the TCP segments to the server 130.

The gateway 140 can be a computer-based server with specialized interfaces capable of interfacing the server 130 with a wireless network. However, it should be appreciated that a "gateway" can be any known or later-developed combination of systems and devices capable of interfacing a wired system with a wireless system, such as a cellular or satellite based network, without departing from the spirit and scope of the present invention.

As shown, the exemplary access point 150 can be a wireless transmitter/receiver capable of transmitting and receiving various radio signals according to a CDMA-based protocol. However, the access point 150 can alternatively be any number of different devices, such as a radio frequency or microwave wireless transmitter/receiver, a transmission/reception system employing wires such as a twisted wire pair, a transmitter/receiver adapted for transmitting across coaxial cable, an optical transmitter/receiver, a fiber/optic transmitter/receiver, a sonic transmitter/receiver, or any other known or later-developed device suitable for transmitting/receiving data. Accordingly, the wireless device 160 can be any number of devices capable of communicating with the access point 150, including specially adapted computer-based systems, cellular phones, personal digital assistants (PDAs) and the like.

During operation, a consumer (not shown) using the wireless device 160 can send a first signal to the access point 150 identifying the consumer and/or wireless device 160 and indicating that the consumer wishes to utilize the server 130 or perhaps access various devices associated with the network 120, such as the data terminal 110.

In response, the server 130 can generate and provide an initial menu and command file, i.e., a file that assigns various command functions to the various buttons/controls on a wireless device that are customized to the wireless device's display and control capacity. The wireless device 160, in turn, can display the starting folder of the menu to the consumer and enact the command file.

For convenience, the first level of a menu can be referred to as a "root" or "root folder". The hierarchical structure of a menu can be defined by the menu's root folder and everything below it can be referred to as a "deck". Each folder, including the root folder, can contain a number of "items". In various embodiments, there can be a variety of different types of items in each folder. A first item of interest is a "folder" item that can be linked to any folder in the menu. Selecting a folder item can cause the wireless device 160 to effectively open the respective folder and display any items contained in that folder.

Other types of items can point to folders containing information, such as email, or can enable a consumer to access external data sources and enact various commands. For example, selecting an "email" item can cause the wireless device 160 to display a received email message, selecting a "URL" item can cause the wireless device 160 to browse a web site pointed to by the URL item, and selecting a "phone" item can cause the wireless device to place a phone call.

Still other items and menu features can be created and/or customized according to the requirements of a particular consumer or group of consumers. For example, a group of consumers can create a special folder item accessible only to those consumers.

Generally, a consumer viewing the wireless device 160 can observe a single folder at a time and navigate about the menu by scrolling about the various items contained in each folder. As discussed above, by selecting a particular folder item, the consumer can navigate upward in the hierarchy of folders towards the root folder or navigate downward to a lower folder. For example, assuming that the consumer starts navigating from the root folder, the consumer can select a folder item contained in the root folder, which can cause the wireless device 160 to open the appropriate folder and display the contents of the folder. The consumer can then navigate to a third folder via another folder item or navigate back to the root folder using a folder item linked to the root folder.

To aid in menu navigation, a consumer can access any number of special tools. For example, the consumer may wish to access a special search engine maintained by the server 130. By entering a number of keywords, the consumer can direct the server 130 to perform a search based on the entered keywords. The server 130 can perform a search and respond to the wireless device 160 in a variety of useful ways, such as provide a special list of relevant items based on the search, direct the consumer to an appropriate folder in the menu or generate a new menu having a new hierarchy of folders.

Returning to FIG. 1, as the consumer navigates about a menu, the wireless device 160 or the server 130 can monitor the consumer's actions and report the consumer's actions to the server 130 or a memory of the server 130. That is, as the consumer navigates about the menu, the server 130 can identify the particular folder that the consumer is viewing as well as any selected item or highlighted item, i.e., an item pointed to while scrolling, but not necessarily selected, and store the information.

In response, the server 130 can perform a number of interactive services to aid the consumer. A first such service can be to generate and cause to be displayed a number of messages related to the subject matter of the folder and/or item. For example, as discussed above, a motorist browsing an automobile service-related folder will more likely respond to messages directed to automobile service providers than messages directed to other subject matter, such as potato chips. In various embodiments, the server 130 can simply provide information about any number of related messages. That is, each folder or item can be linked to a list of one or more messages that the server 130 can automatically provide.

However, it should be appreciated that the server 130 can also provide messages using a search engine that can perform a search based on any number of searchable terms known to the server 130, such as past buying patterns of the consumer, special dining packages advertised by various restaurants and the like.

Furthermore, considering that the consumer may benefit from options or information based on data not immediately known or available to the server 130, it should be appreciated that, as the consumer navigates about a menu, a particular navigation command can activate a script design to acquire such specific data from the consumer. The data can then be provided to the server 130, which in turn can be used to perform searches that can result in the server 130 providing helpful services, such as generating special messages, providing special lists or folders to the consumer, accessing special networks or servers, making reservations, placing a number of phone calls and the like.

For example, assuming a consumer navigates about a restaurant-related folder and highlights an "Italian Cuisine" item, the wireless device 160 can activate a script on the server 130. The server 130 can then generate specific script messages, such as queries that the consumer can answer. In various embodiments, a query can take the form of a limited list of options that the consumer can answer by selecting among the available options. A query can also take the form of a keyword entry or a query can take the form of a mixture of textual and/or vocal messages generated by the server 130. While the exemplary server 130 generates queries based on a keyword entry paradigm, it should be appreciated that a query can take any form useful to evoke a response from a consumer without departing from the spirit and scope of the present invention.

Depending on the form of the query, the consumer can reply using any number of appropriate techniques, such as selecting an option from a list, entering keywords using a keypad or responding to queries using a limited vocabulary of verbal responses, such as a "yes"/"no"/"not sure" reply. Where the consumer makes a reply verbally, it should be appreciated that a voice recognition device should be employed, either at the wireless device 160 or at the server 130. However, the particular location of any intermediate tools, such as voice generation and voice recognition devices, can vary without departing from the spirit and scope of the present invention.

Returning to the example above, once the consumer has provided responses to the various restaurant queries, the server 130 can perform a search based on the responses and provide various messages or perform further queries as designated by the script. Assuming that the consumer selects a particular restaurant, the server 130 can then perform further operations according to the ongoing script, such as make a restaurant reservation using the data terminal 110 or automatically cause the wireless device 160 to place a call to the restaurant of choice.

The exemplary data terminal 110 can be a special server providing Internet-related services. However, the data terminal 110 can also be any one of a number of different types of data processors, such as a computer, a storage device, or any combination of software or hardware capable of generating, relaying, or recalling from storage data capable of being transmitted, directly or indirectly, to a transmission network, or medium, using a network protocol without departing from the spirit and scope of the present invention.

The exemplary network 120 can be a portion of the Internet. However, the network 120 can also be a wide area network or a local area network, an intranet, any subset of the Internet, or any distributed processing network or system. In general, the network 120 can be any known or later-developed combination of transmission mediums, computer programs, or structures, wired or wireless, that are usable to transmit data between the data terminal 110 and the server 130 without departing from the spirit and scope of the present invention.

Accordingly, links 112 and 122 can be links with the Internet. However, links 112 and 122 can also be links in a wide area network or a local area network, an intranet, any subset of the Internet, or links on any distributed processing network or system. In general, links 112 and 122 can be any known or later-developed transmission medium, computer program, or structure, wired or wireless, that is usable to transmit data between the network 120 and the data terminal 110 and server 130 without departing from the spirit and scope of the present invention.

Figure 2:
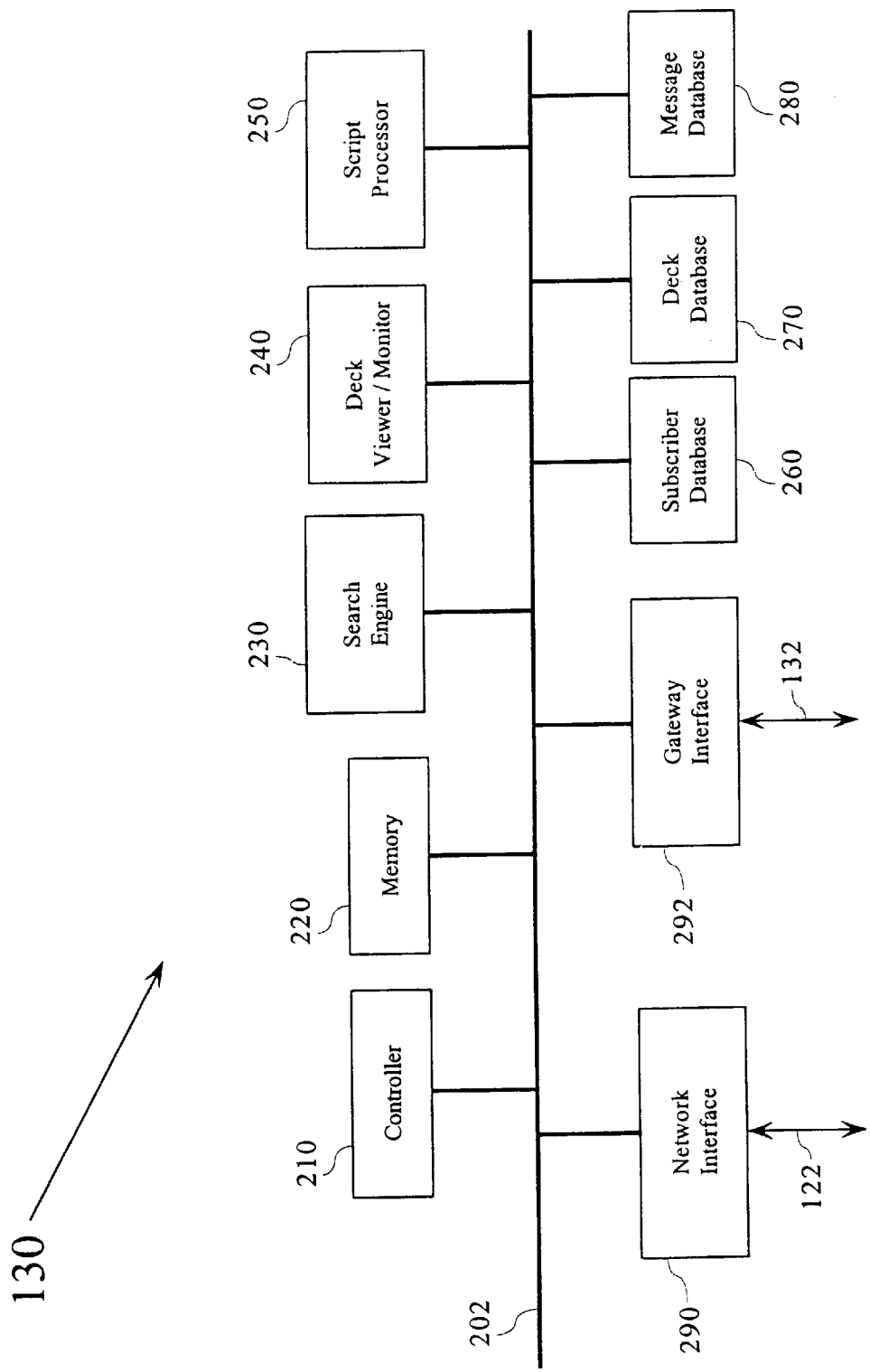
FIG. 2 is a block diagram of the exemplary gateway of FIG. 1.

FIG. 2 is a block diagram of the exemplary server 130 of FIG. 1. As shown in FIG. 2, the exemplary server 130 can include a controller 210, a memory 220, a search engine 230, a deck manager 240, a script processor 250, a subscriber database 260, a deck database 270, a message database 280, a network interface 290 and a gateway interface 292. The above components 210–292 are coupled together by control/ data bus 202. Although the exemplary server 130 uses a bussed architecture, it should be appreciated that any other architecture may be used, as is well known to those of ordinary skill in the art.

In operation, the controller 210 can controllably receive an initiation signal from a wireless device via the gateway interface 292 and link 132 and provide the initiation signal to the memory 220 and the deck manager 240. As discussed above, an initiation signal can contain an identifier relating to a particular consumer and/or wireless device.

The deck manager 240 can receive the initiation signal and extract the enclosed identifier. Using the identifier, the deck manager 240 can extract information relating to the wireless device from the subscriber database 260. In various embodiments, the exemplary subscriber database 260 can contain an assortment of information on each applicable wireless device. For example, the subscriber database 260 can contain information specific to the wireless device, such as the wireless device's display size and resolution, the configuration of available control buttons and the available voice recognition/generation capabilities, if any.

In other exemplary embodiments, the subscriber database 260 can further contain information specific to a particular consumer, such as the consumer's buying patterns and preferences, a user's historical profile, such as a history of item folders and searches they have performed, credit card information, personal identification numbers (PINs) and the like. Other information can include any known or later-recognized technique useful to provide a consumer service, such as generating targeted messages or scripts, making reservations, making secure purchases and the like, without departing from the spirit and scope of the present invention.

Returning to FIG. 2, once the deck manager 240 has retrieved the appropriate information from the subscriber database 260, the deck manager 240 can access the deck database 270. The exemplary deck database 270 can contain a first pre-existing menu database where each entry can describe the organization of a particular menu, i.e., a hierarchical organization of the root folder and subsequent deck.

However, as each folder can contain a number of items having different properties, the exemplary deck database 270 can also contain a folder database that can list the various items of each folder.

Furthermore, because each folder can contain a variety of item types, the exemplary deck database 270 can further contain an item database that can describe the functionality of each type of item. For example, as discussed above, a folder can contain item types such as folder items, URL items, phone items, email items and the like. Accordingly, for each item, the deck database 270 can contain a number of related fields that define the functionality of the item. For example, a folder item could contain a "folder name" field, a "time and date created" field, a field containing a number of keywords that a search engine can use to perform a search operation, a pointer to the folder that the folder item relates to, or any other field useful to enable a wireless device to navigate a menu.

Similarly, an email item could contain a "folder name" field, a "time and date created" field, a field for storing a time, such as a time frame, when the item can or should be shown, a field containing a number of unread emails, a pointer to a block in a memory where each email message is stored, or any other field useful to a consumer to access an email account.

For functional items, such as phone and email items, it can also be useful to have a "handler" field, which can be a pointer to a block of instructions useful to process the item. For the phone item example above, an appropriate handler could contain a sequence of instructions that can cause a wireless device to access a public switching telephone network (PSTN), generate a series of dual-tone multi-frequency (DTMF) signals and enable a speaker and earphone.

Once the deck manager 240 has received the appropriate information from the deck database 270, the deck manager 240 can provide one of the pre-existing menus to the wireless device, or the deck manager 240 can create and organize a new menu using information from both the deck database 270 and subscriber database 260 and provide the newly created menu to the wireless device via the gateway interface 292 and link 132.

As discussed above, it should be appreciated that a wireless device communicating with the server 130 can monitor and report every navigation operation that the consumer performs. That is, as the consumer navigates about a menu, the wireless device can report which folder is selected, which items are highlighted or selected, whether any special command buttons are activated and the like.

As such navigation information is received, the deck manager 240 can provide any number of appropriate responses, such as display messages and activate scripts. For example, in various embodiments, assuming the consumer navigates to a folder relating to stock prices, the deck manager 240 can extract a predetermined message from the message database 280 and provide the message to the wireless device.

In other embodiments, rather than simply providing a predetermined message, the deck manager 240 can perform a search on the deck database 270 using the search engine 230 and a combination of keywords extracted from the subscriber database 260 and/or extracted from keyword fields associated with the various folders and items. Once a list of keywords are compiled, the deck manager 240 can provide the keywords to the search engine 230 along with an instruction requesting that a message search be performed.

The search engine 230 can receive the keywords and search instruction, and perform a search on the message database 280 using the received keywords. The search engine 230 can then return a list of messages generated by the search to the deck manager 240, which can then select one or more of the messages and provide the selected messages to the wireless device. While the deck manager 240 can select such messages for display using a priority rating associated with each message, it should be appreciated that the particular methodology that the deck manager 240 uses to select specific messages can vary without departing from the spirit and scope of the present invention.

As an alternative to simply providing messages, a particular response by a consumer can alternatively take the form of a script. As discussed above, a script can be a series of coordinated operations directed to performing useful tasks. For example, assuming a consumer opens a folder containing a number of URLs that point to a number of clothing-related retail web sites, the deck manager 240 can identify a script contained in the message database 280 that the consumer may find useful. The deck manager can then provide the script to the script processor 250, which can process the script.

While any particular script can prove useful, it should be appreciated that such scripts should preferably not be a burden to a consumer. Accordingly, a consumer should have the option of ignoring a particular script in favor of performing continued navigation operations. In such cases where the consumer ignores or otherwise fails to respond to a script, the script processor 250 can suspend any operations that may hinder the consumer's intended activities until such time as the deck manager 240 directs the script processor 250 to cancel the ongoing script or start a second script. For the clothing-related URL example above, the consumer may choose not to reply to the activated script, but proceed to select one of the available URL items. In response, the deck manager 240 can direct the script processor 250 to cancel the clothing-related script and provide a signal to the controller 210 indicating that the consumer wishes to access the web site pointed to by the selected URL item.

The controller 210 can receive the signal from the deck manager 240 and provide a pathway to the appropriate web site using the network interface 290 and link 122. Simultaneously, the deck manager 240 can continue to monitor the consumer's activities and continue to provide messages and scripts based on the consumer's activities until the consumer indicates a desire to end his activities or the signal pathway between the server 130 and wireless device is interrupted.

Figure 3:
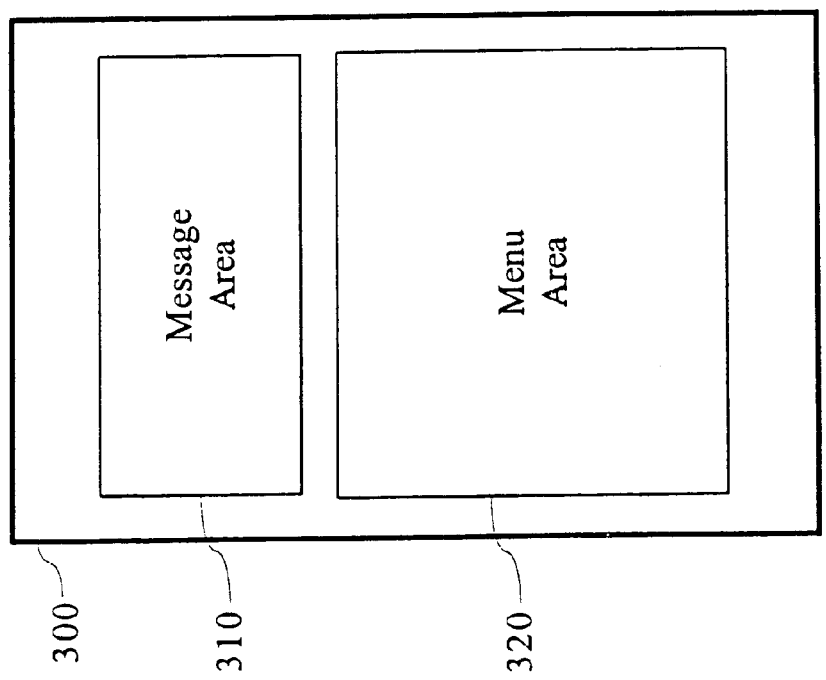
FIG. 3 is a block diagram of an exemplary display.

FIG. 3 is a block diagram of an exemplary display 300 residing on a wireless device, such as an Internet-ready cellular phone. As shown in FIG. 3, the display 300 contains a message area 310 and a menu area 320. As discussed above, it should be appreciated that a wireless display can be very limited in size and resolution as compared to a personal computer. Accordingly, the exemplary menu area 320 can generally display only a single folder, or portion thereof, at a time and the message area can similarly only display a single message at a time. However, given that the size, resolution and other features of a display can vary drastically from one wireless device to another, it should be appreciated that the display capacity of the message area 310 and menu area 320 can vary without departing from the spirit and scope of the present invention.

Figure 4:
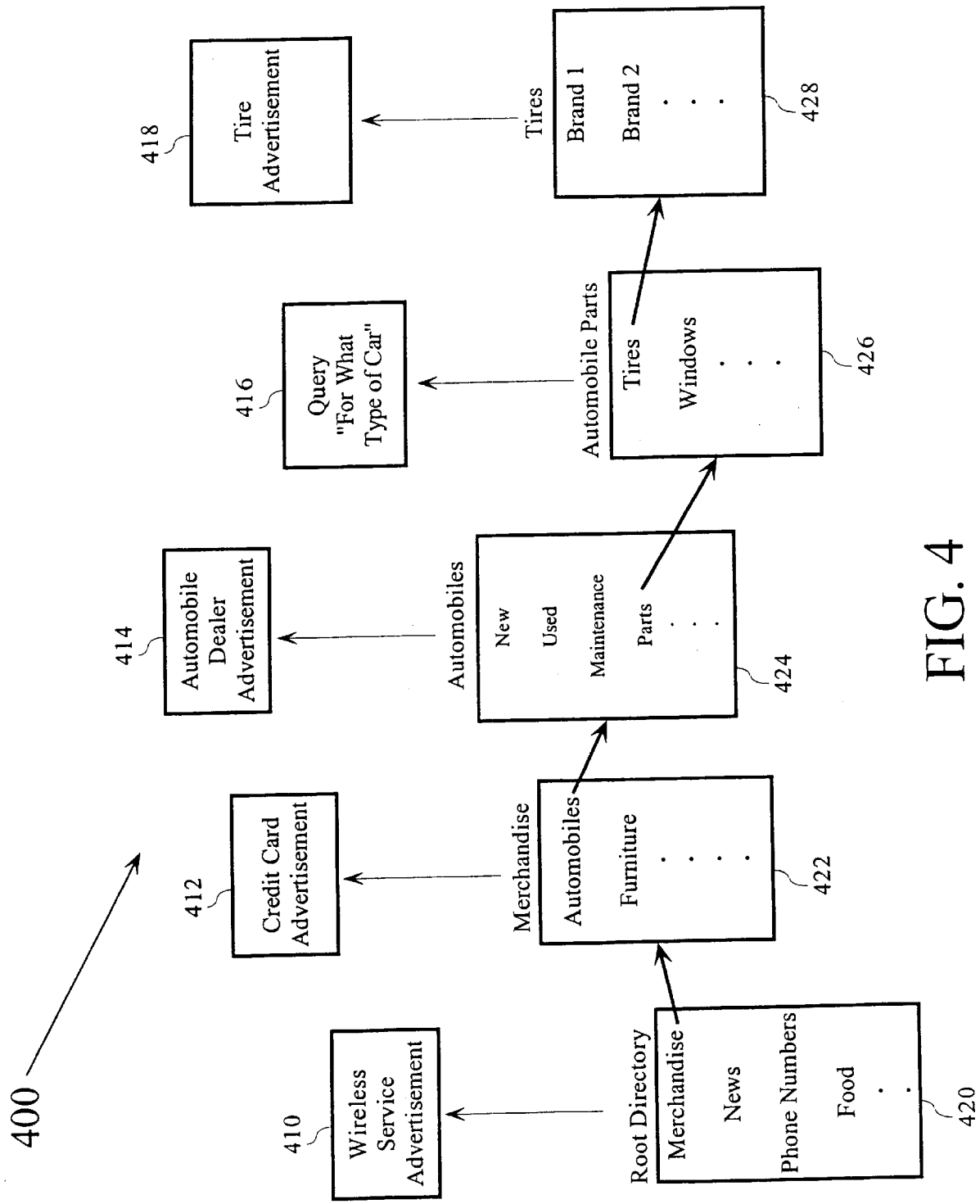
FIG. 4 depicts a series of menu folders in a hierarchical menu deck structure with respective messages.

FIG. 4 depicts a menu portion 400 consisting of a hierarchy of folders 420–428 with respective messages 410–418. As shown in FIG. 4, the menu portion 400 has a root folder 420 containing a varied list of items directed to other folders, information and commands. Also shown in FIG. 4, the root menu 420 has a respective root message 410, which can be a revolving series of wireless service advertisements and status information, such as an indication of a number of unread email/voicemail messages.

Assuming that a consumer selects a folder item relating to general merchandise, a second folder 422 containing a number of items relating to various merchandise can be displayed along with a second message 412 relating to a credit card advertisement. Further assuming that the consumer selects an automobile item from the second folder 422, a third folder 424 containing a number of automobile-related items along with a respective third message 414 relating to a particular automobile dealer can be displayed. Still further, assuming that the consumer selects the appropriate items, the fourth folder 426 with respective fourth message 416 and fifth folder 428 with respective fifth message 418 can be displayed.

FIG. 4 demonstrates that a given message can be tailored to a particular displayed folder. That is, rather than display random messages, a wireless device can display messages and advertisements directed to the subject matter of a folder. For example, the fifth folder 428 contains a number of items directed to various tire brand names. Accordingly, the fifth message 418 can contain various tire advertisements that can inform a consumer as to tire pricing and sales information.

As consumers are now constantly assaulted by advertisements directed to the general public, it is recognized that consumers not only tend to ignore most general advertisements, but consumers can even become highly agitated by the constant bombardment of the random advertisements by virtually every form of media. However, it is also recognized that consumers still do respond to advertisements concerning a given subject matter in which they have shown an immediate interest.

Accordingly, if a consumer indicates an interest in a particular subject by navigating into a folder containing items relevant to the subject, messages directed to the immediate subject matter are far more likely to be well received and responded to than general advertisements, thus providing a great service to both the consumer and advertiser.

FIG. 5 depicts the fifth folder 428 of FIG. 4 with a scroll bar 510 that can point to, i.e., highlight, the various items contained in the fifth folder 428. As shown in FIG. 5, the respective message 518 can be tailored to the specific tire brand highlighted by the scroll bar 510, as opposed to the tire message 418 of FIG. 4, which related only to the tire folder 428 in general. Accordingly, it should be appreciated that, as a consumer scrolls among the various tire brand items, a specific message relating to the highlighted item can be displayed for the convenience of the consumer.

FIG. 6 depicts the fifth folder 428 of FIG. 5 with the scroll bar 510 highlighting another tire brand item. Like the example of FIG. 5, the highlighted item can evoke a related response, e.g., a message. However, unlike the example of FIG. 5, the activated response of FIG. 6 is a script 628 directed to a series of operations. For example, in a first operation, the script 628 can perform a first operation designed to attract a consumer's attention.

If the consumer responds to the script 628, the exemplary script 628 can evoke a second operation by providing the customer with a number of available tire options and respective prices from which to choose. Next, the script can search the databases of various vendors via the Internet to assure that a particular vendor has the customer's tire choice in stock. Then the script can perform a number of value-added services, such as reserve/purchase the tire(s) using the consumer's credit card information, arrange for towing and place a phone call to the appropriate tire vendor.

While FIGS. 4–6 depict a display having separate menu and message display portions, it should be appreciated that menus, messages and scripts can alternatively operate from a single display area or any number of areas as required or otherwise found ergonomically desirable without departing from the spirit and scope of the present invention.

Figure 7:
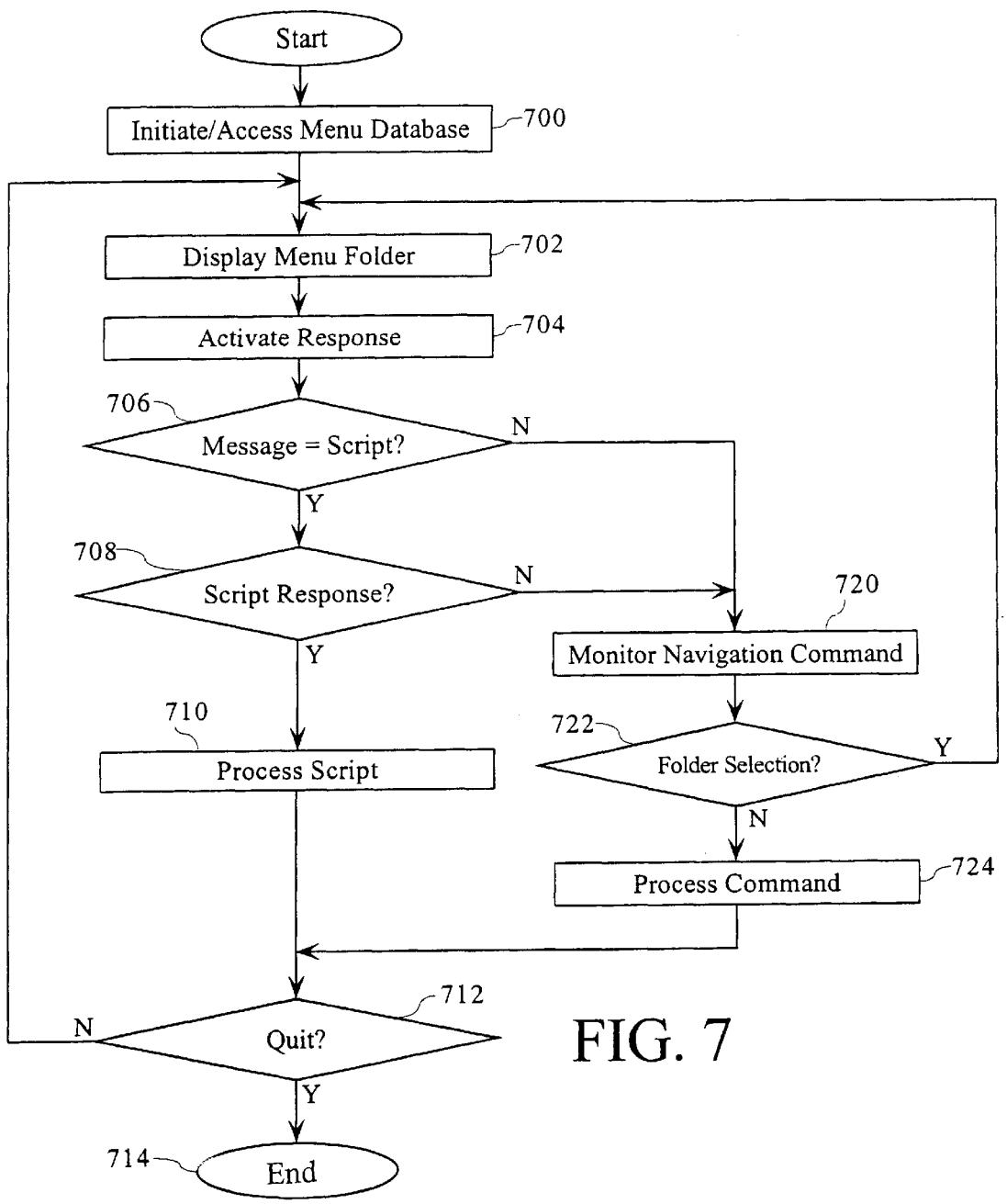
FIG. 7 is a flowchart outlining an exemplary operation for navigating a hierarchical menu that uses a complimentary message notification scheme.

FIG. 7 is a flowchart outlining an exemplary operation for displaying messages and operating scripts in response to a consumer's menu navigation commands. The process begins in step 700 where a consumer can initiate contact with a server using a wireless device to access the server's menu database and retrieve an initial menu. Next, in step 702, a root folder of the initial menu is displayed at the wireless device. Then, in step 704, the server can activate a response, such as displaying a message or performing a script, that can be provided to and enacted by the wireless device. Control continues to step 706.

In step 706, a determination is made as to whether the response activated in step 704 is a script, as opposed to a simple message. If the response is a script, control continues to step 708; otherwise, control jumps to step 720.

In step 708, a determination is made as to whether the consumer has responded to the script activated in step 704, as opposed to ignoring the script in favor of further navigating the menu. If the consumer has responded to the script, control continues to step 710; otherwise, control jumps to step 720.

In step 710, the activated script of step 704 is processed. As discussed above, a script can be directed to a series of operations, such as making queries, providing messages, accessing external information and executing commands. Also as discussed above, a script can not only perform various operations, such as make queries and execute commands, but a script can also generate new menus or cause a wireless device to redirect an existing menu to a particular folder of interest. Control continues to step 712.

In step 720, because the response of step 704 is not a script or because the script response was ignored by the consumer, the consumer's navigation commands are monitored until a navigation command is detected. Control continues to step 722. In step 722, a determination is made as to whether the consumer has selected a folder item, as opposed to items directed to actions such as accessing information, executing commands and the like. If the consumer has selected a folder item, control jumps back to step 702 where the selected folder is opened and its contents displayed; otherwise, control continues to step 724.

In step 724, the navigation command monitored and detected in step 724 is processed. As discussed above, the operations performed in response to selecting particular items can vary according to the nature of the selected item. For example, if the consumer selects a phone item, the wireless device can immediately place a phone call using the selected phone number. Control continues to step 712.

In step 712, a determination is made as to whether the consumer has indicated a desire to quit navigating about the menu. If the consumer has indicated a desire to quit navigating, control continues to step 714 where the process stops; otherwise, control jumps back to step 702 where a new selected folder, if any, is opened and its contents displayed.

As shown in FIG. 2, the methods of this invention are preferably implemented using a general-purpose computer such as a personal computer with peripheral integrated circuit elements and dedicated communication hardware. However, the server 130 can be implemented using any combination of one or more programmed special purpose computers, programmed microprocessors or microcontrollers and peripheral integrated circuit elements, ASIC or other integrated circuits, digital signal processors, hard-wired electronic or logic circuits such as discrete element circuits, programmable logic devices such as a PLD, PLA, FPGA or PAL, or the like. In general, any device capable of implementing a finite state machine that is in turn capable of implementing the flowchart shown in FIG. 7 can be used to implement the server 130.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. Thus, there are changes that may be made without departing from the spirit and scope of the present invention.

What is claimed is:

1. A method for providing information on a wireless device, comprising:

receiving a navigation command using the wireless device, wherein the navigation command is a command in response to navigating around items on a menu;

automatically receiving, from a remote source, related information based on the received navigation command; and displaying at the wireless device a first directed message based on the received navigation command and the received related information, wherein the related received information is any information beyond that information which would be displayed solely in response to a selection of the navigation command.

2. The method of claim 1, further comprising displaying at least a portion of a folder of the menu.

3. The method of claim 1, wherein the received navigation command is a folder item selection.

4. The method of claim 1, wherein the received navigation command is an item highlight.

5. The method of claim 1, wherein automatically receiving related information based on the received navigation command comprises activating a script directed to performing one or more operations based on the received navigation command, and wherein the first directed message is a script message.

6. The method of claim 5, wherein the one or more script operations include displaying a commercial advertisement.

7. The method of claim 5, wherein the one or more script operations include at least providing a query.

8. The method of claim 7, wherein the one or more script operations further include accessing information relating to an external network in response to the query.

9. The method of claim 8, wherein the accessed information is provided using a search based on the query.

10. The method of claim 7, wherein the one or more script operations further include at least one of displaying at least a portion of a second folder based on the query and receiving a second menu based on the query.

11. The method of claim 7, wherein the one or more script operations are directed to at least one of making a purchase based on the query, making a reservation based on the query and placing a phone call based on the query.

12. A method for providing information to a wireless device, comprising:

receiving, from a remote source, related information relating to a navigation command from the wireless device, wherein the navigation command is a command in response to navigating around items on a menu; and providing first information based on the received related information, wherein the wireless device displays a first directed message based on the navigation command and the first information, and the related information is any information beyond that information which would be displayed solely in response to a selection of the navigation command.

13. The method of claim 12, wherein the navigation command is a folder item selection.

14. The method of claim 12, wherein the navigation command is an item highlight.

15. The method of claim 12, wherein the first directed message is a query.

16. The method of claim 15, wherein the query is one operation of a script directed to one or more script operations.

17. The method of claim 16, wherein the one or more script operations further include accessing information relating to an external network in response to the query.

18. The method of claim 16, wherein the one or more script operations further include at least one of providing a script message based on the query, providing at least a portion of a second folder based on the query and providing a second menu based on the query.

19. The method of claim 16, wherein the one or more script operations further include at least one of facilitating a purchase based on the query, facilitating a reservation based on the query and placing a phone call based on the query.

20. The method of claim 16, wherein the accessed information is provided using a search based on the query.

21. A device for providing information to a wireless device, comprising:

an interface that receives, from a remote source, related information relating to navigation command from the wireless device, wherein the navigation command is a command in response to navigating around items on a menu; and a managing device that automatically provides first information based on the received related information, wherein the wireless device displays a first directed message based on the received navigation command and the first information, and the related information is any information beyond that information which would be displayed solely in response to a selection of the navigation command.

22. The device of claim 21, wherein the navigation command is one of a folder item selection and an item highlight.

23. The device of claim 22, further comprising a script processor, wherein the first information is provided in response to a script directed to one or more operations activated by the received navigation command.

24. The device of claim 22, wherein the one or more script operations further include a query.

25. The device of claim 24, wherein the one or more script operations further include accessing information relating to an external network in response to the query.

26. The device of claim 24, wherein the one or more script operations further include at least one of providing a script message based on the query, providing at least a portion of a second folder based on the query and providing a second menu based on the query.

27. The device of claim 24, wherein the one or more script operations further include at least one of facilitating a purchase based on the query, facilitating a reservation based on the query and placing a phone call based on the query.

28. The device of claim 24, further comprising a search engine that can provide at least one or more directed messages based on the query.

* * * * *